US006912376B1

(12) United States Patent
Smith et al.

(10) Patent No.: US 6,912,376 B1
(45) Date of Patent: Jun. 28, 2005

(54) MOBILE PHONE TRANSCEIVER

(75) Inventors: Donald E. Smith, Plano, TX (US); Steven Lazar, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/472,551

(22) Filed: Dec. 27, 1999

(51) Int. Cl.[7] .............................................. H04B 1/40
(52) U.S. Cl. ........................... 455/77; 455/76; 455/78; 455/85; 455/86; 455/112; 455/550.1; 455/552.1
(58) Field of Search .............................. 455/76, 77, 78, 455/86, 74, 73, 84, 188.1, 150.1, 552, 550, 112, 85

(56) References Cited

U.S. PATENT DOCUMENTS

| | | | | |
|---|---|---|---|---|
| 5,423,076 A | * | 6/1995 | Westergren et al. | 455/86 |
| 5,432,779 A | * | 7/1995 | Shimo et al. | 370/206 |
| 5,511,236 A | * | 4/1996 | Umstattd et al. | 455/76 |
| 5,590,413 A | * | 12/1996 | Kondratiev et al. | 455/86 |
| 5,732,330 A | * | 3/1998 | Anderson et al. | 455/76 |
| 5,890,051 A | | 3/1999 | Schlang et al. | 455/76 |
| 5,892,410 A | | 4/1999 | Peckham | 331/117 |
| 5,963,852 A | * | 10/1999 | Schlang et al. | 455/76 |
| 5,966,666 A | * | 10/1999 | Yamaguchi et al. | 455/552 |
| 5,983,081 A | * | 11/1999 | Lehtinen | 455/76 |
| 5,987,309 A | * | 11/1999 | Adachi et al. | 455/86 |
| 5,995,815 A | * | 11/1999 | Blom | 455/189.1 |
| 6,016,422 A | * | 1/2000 | Bartusiak | 455/76 |
| 6,161,000 A | * | 12/2000 | Yang et al. | 455/118 |
| 6,397,044 B1 | * | 5/2002 | Nash et al. | 455/73 |
| 6,421,530 B1 | * | 7/2002 | Adachi et al. | 455/86 |

FOREIGN PATENT DOCUMENTS

| | | |
|---|---|---|
| EP | 0 78 974 A | 10/1995 |
| EP | 0 878 917 A | 11/1998 |
| WO | WO 97 30523 A | 8/1997 |

* cited by examiner

*Primary Examiner*—Marceau Milord
(74) *Attorney, Agent, or Firm*—Wade James Brady, III; Frederick J. Telecky, Jr.

(57) ABSTRACT

A multiple band transceiver (10) uses a fixed frequency oscillator (34) to generate a reference signal in both receive, mode and transmit mode for each frequency band. A dual-band variable oscillator (26) is used to tune signals in receive and transmit mode. The use of the fixed frequency oscillator in both modes and in each band reduces the number of oscillating components, simplifying the circuit and reducing power requirements.

16 Claims, 2 Drawing Sheets

MOBILE PHONE TRANSCEIVER

CROSS REFERENCE TO RELATED APPLICATIONS

Not Applicable

STATEMENT OF FEDERALLY SPONSORED RESEARCH OR DEVELOPMENT

Not Applicable

BACKGROUND OF THE INVENTION

1. Technical Field

This invention relates in general to communications and more particularly to an efficient transceiver design for mobile phones.

2. Description of the Related Art

Mobile phone communications are now common throughout the world However, there are several communication standards over which mobile phones communicate, using different frequency bands. For example in Europe two cellular standards are available, GSM 900 (Global System for Mobile) using the frequency range of 925–960 MHz, and DCS 1800 (Digital Cellular System) using the frequency from 1805 to 1880 MHz For manufacturers of mobile communications equipment, it is desirable to use a single transceiver to cover multiple frequency bands to provide equipment that can be used with either standard when a multi band cellular phone is required to cover a wide range of operating frequencies in two or more separate frequency bands, however, it has been necessary to use several oscillators and synthesizers at RF and IF frequencies. The resulting transceiver is large, complex and uses a significant amount of power. Since battery life is a primary consideration in a cellular phone purchase, it is extremely desirable to reduce the amount of power consumed by the cellular transceiver circuitry.

Accordingly, there is a need for a mobile phone transceiver with reduced circuitry requirements.

BRIEF SUMMARY OF THE INVENTION

In the present invention, a transceiver comprises circuitry for receiving an input signal in one of a plurality of frequency bands, circuitry for tuning the input signal to an intermediate frequency signal, a fixed frequency oscillator generating a reference signal at a known frequency, circuitry for demodulating the intermediate frequency signal responsive to the reference signal, and circuitry for transmitting data at a frequency controlled by the reference signal.

The present invention improves upon the prior art in many ways. First, a single oscillator operates at a single frequency to provide a reference signal for both the demodulation of data in receive mode and for locking the transmit frequency in transmit mode. this reduces circuitry, because a single oscillator is used for multiple frequency bands, without the need for switching in response to a change in mode (transmit/receive) or frequency band (GSM/DCS). Further, the circuitry is simplified because a fixed frequency oscillator is used, reducing the number of VCOs in the transceiver.

BRIEF DESCRIPTION OF THE SEVERAL VIEWS OF THE DRAWINGS

For a more complete understanding of the present invention, and the advantages thereof, reference is now made to the following descriptions taken in conjunction with the accompanying drawings, in which.

DETAILED DESCRIPTION OF THE INVENTION

Figure 1:
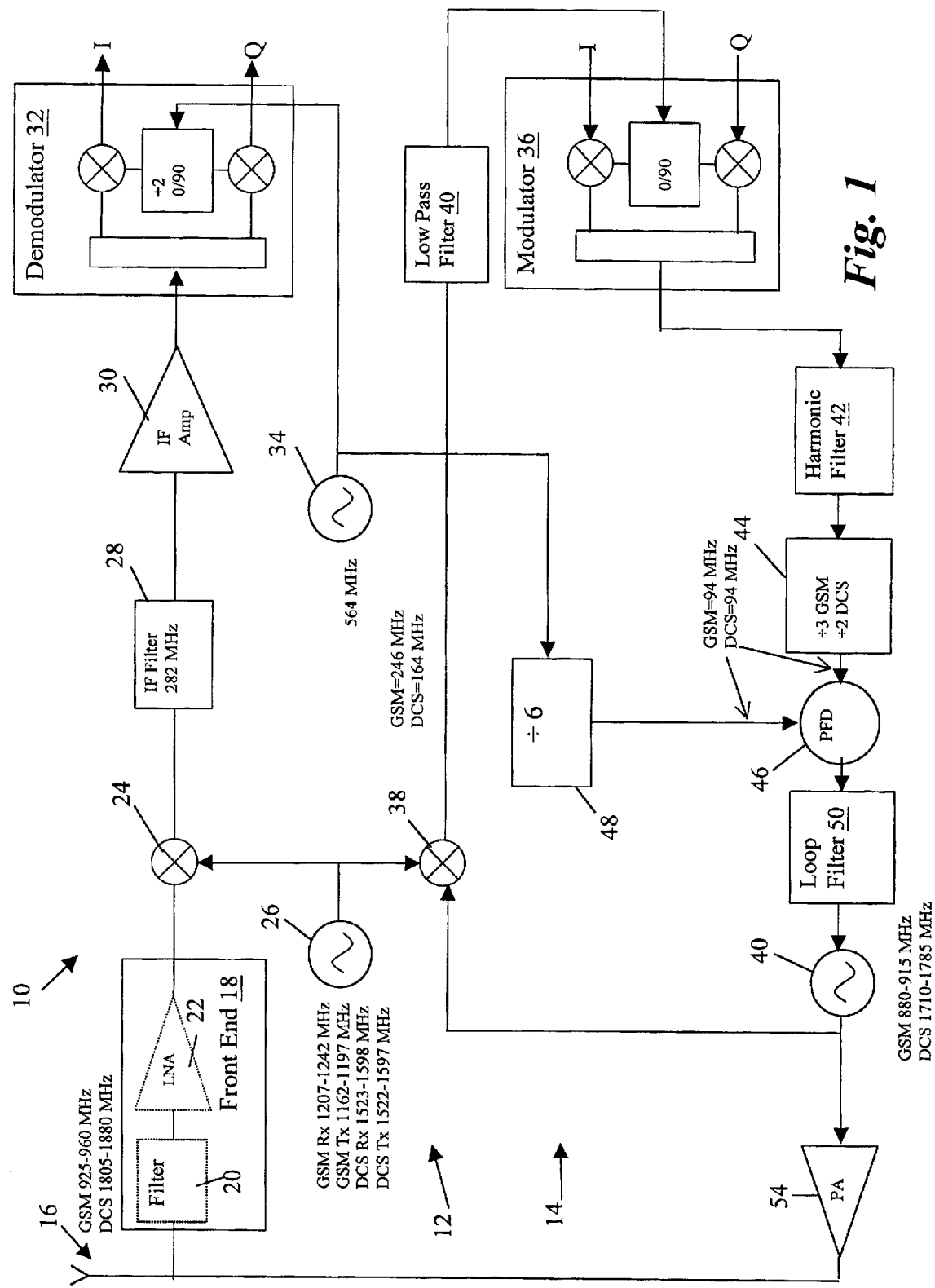
FIG. 1 illustrates a first embodiment of a transceiver.
Figure 2:
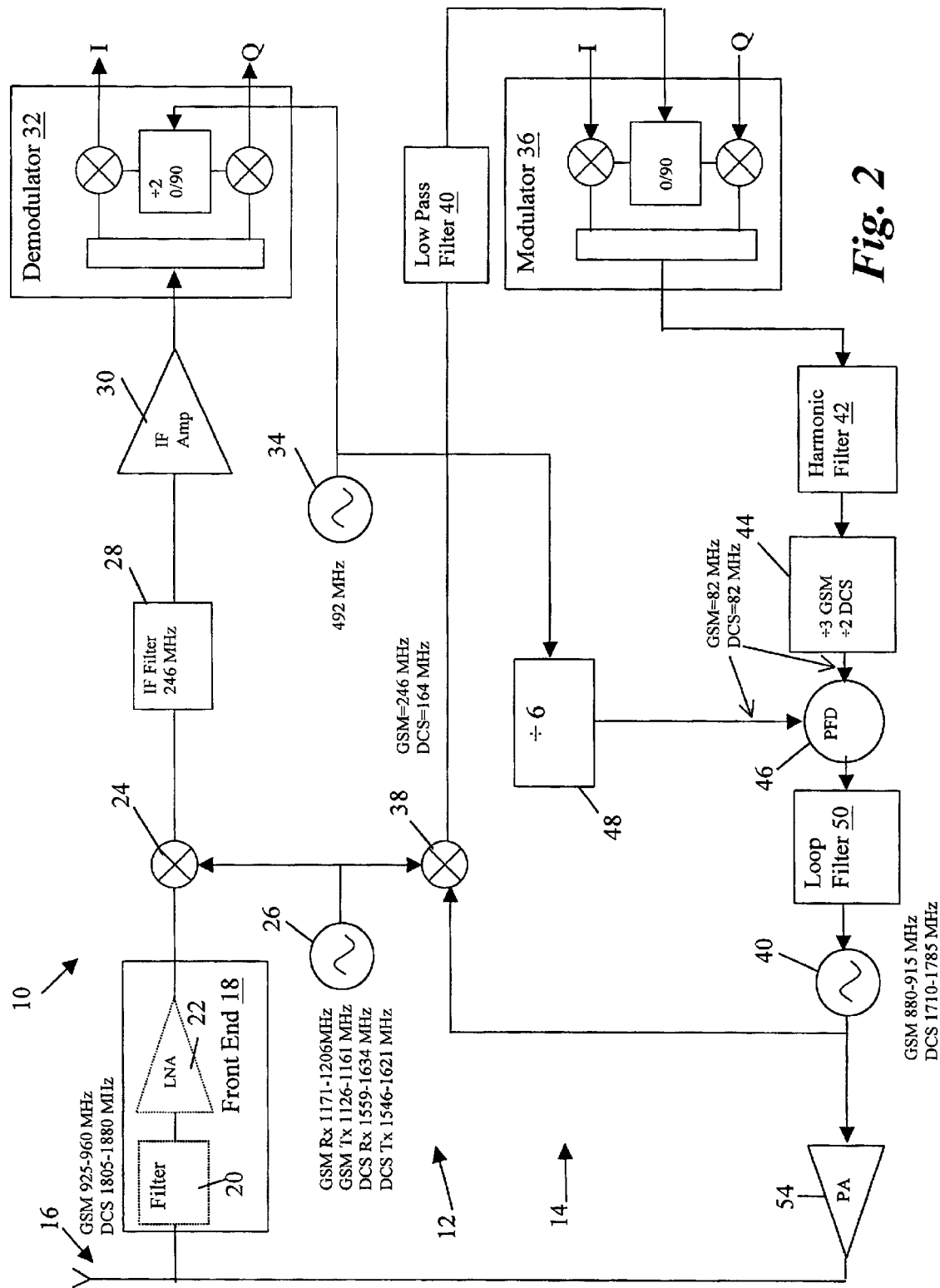
FIG. 2 illustrates a second embodiment of a transceiver.

The present invention is best understood in relation to FIGS. 1–2 of the drawings, like numerals being used for like elements of the various drawings.

FIG. 1 illustrates a first embodiment of the present invention for a transceiver that operates on both the GSM and DCS frequency bands; the invention, however, could be expanded to transceivers that operate on different frequency bands from those shown, or transceivers that operate on more then two frequency bands.

The transceiver 10 includes a receiver 12 and a transmitter 14, with some circuitry shared between the receiver 12 and transmitter 14, as will be discussed in greater detail hereinbelow. In the receiver section 12 signals are received on antenna 16 and processed through front end 18, which includes a filter 20 and a low noise amplifier 22. The output of the front end 18 is received by mixer 24, which outputs a signal that is the difference between the output of dual-mode VCO (voltage controlled oscillator) 26 and the output of front end 18 (in other embodiments, the output of VCO 26 could be added to the output of front end 18 by mixer 24). The frequency of the signal output from VCO 26 depends upon whether VCO 26 is in receive or transmit mode, and the channel in which data is being transmitted or received. The output of mixer 24 is the intermediate frequency (IF). The intermediate frequency is filtered by bandpass filter 28 to pass a small band of frequencies around the intermediate frequency. The output of IF filter 28 is amplified by IF amplifier 30. The output of amplifier 30 is received by demodulator 32, along with a reference frequency from fixed frequency oscillator 34. Demodulator 32 divides the reference signal from oscillator 34 by a factor of two, and produces two signals offset by 90 degrees to derive the I (real) and Q (imaginary) data components from the IF signal. Typically, the I and Q components are sent to a DSP (Digital Signal Processor, now shown) for processing.

The transmitter 14 receives I and Q components from the DSP or other processor in modulator 36. The I and Q components are modulated using a signal from mixer 38 which is the difference (or, alternatively, the sum) of the output of the output of VCO 26 and the output of VCO 40. The output of mixer 38 is coupled to low pass filter 41. The output of low pass filter 41 is coupled to a phase shift circuit in modulator 36,which produces two signals which have a 90 degree phase difference. The modulated output of the modulator 36 is received by filter 42, which filters harmonics from the signal. The output of filter 42 is received by divider 44, which divides the frequency of the signal by a factor dependent upon the frequency band (GSM or DCS) in which the transceiver operating. The output of divider 44 is coupled to phase-frequency detector (PFD) 46. Phase-frequency detector 46 also receives a reference signal from oscillator 34, through divider 48 (in this embodiment, the divider has a fixed ratio independent of the frequency band, other embodiments could use different divide ratios for each frequency band). The output of phase-frequency detector 46 is coupled to loop filter 50. The output of loop filter 50 is coupled to VCO 40. The output of VCO 40 is coupled to power amplifier 54, as well as to mixer 38. The power amplifier 54 outputs the transmit signal to antenna 16.

The operation of the transceiver 10 is best understood in connection with frequency specifications shown in the illustrated embodiment of FIG. 1, where the transceiver 10 is in dual-mode operation with the GSM band and the DCS band. It should be understood, however, that the transceiver could be used with different combinations of frequency bands. Particular frequencies are provided in FIG. 1, to aid in understanding the operation of the invention; other embodiments could use different frequencies.

Depending upon the channel, the signal being received is in the range of 925–960 MHz for GSM and between 1804 and 1880 for DCS. Assuming that data is being received on channel "1", the frequency of the GSM signal would be 925 MHz. The output of VCO is dependent upon the current channel. For channel "1" in receive mode, the frequency of the signal from VCO 26 would be 1207 MHz. The frequency of the output of mixer 24 would be the difference, or 282 MHz. For any channel, VCO 26 is controlled to output a signal with a frequency that will cause the IF to be modulated at 282 MHz. The demodulator therefore uses a frequency of 282 MHz to demodulate the data. This frequency is obtained by dividing the output of fixed oscillator 34 by two; the frequency divider also automatically provides two signals which are offset by 90 degrees.

A DCS signal will be modulated in the range of 1085–1880 MHz and VCO 26 outputs a frequency of 1523–1598, depending upon the channel being received. Assuming that data is being received on channel "1", the DCS frequency would be 1805 MHz and the frequency of the signal from VCO 26 would be 1523 MHz. The frequency of the output of mixer 24 would again be 282 MHz, The demodulator uses a frequency of 282 MHz, obtained by dividing the output of fixed oscillator 34 by two, to demodulate DCS data. Thus, the same circuitry can be used to demodulate data in both frequency bands.

On the transmit side, data is modulated at a range of 800–915 MHz for GSM and 1710–1785 MHz for DCS. For GSM transmissions, VCO 26 generates a signal with frequency in the range of 1162–1197 MHz, depending upon the channel being used. For DCS transmissions, VCO 26 generates a signal with a frequency in the range of 1522–1597. The output of mixer 38 will then be at 282 MHz for GSM and at 188 for DCS. The low pass filter filters out noises above 282 MHz. The filtered signal is used to modulate the data in modulator 36. Harmonics from the output of the modulator 36 are filtered by harmonic filter 42. This signal is divided by a factor of three for GSM or a factor of two for DCS, to produce a 94 MHz signal for both frequency bands. The signal produced by oscillator 34 is divided by a factor of 6 (for both GSM and DCS) to produce a 94 MHz reference signal. The outputs of dividers 44 and 48 are compared in phase-frequency frequency detector 46, which generates a voltage responsive to the difference in phase and frequency between the two signals. This signal, after passing through loop filter 50, drives VCO 40 to produce the output signals that is amplified by power amplifier 54. The feedback through mixer 38 locks the signal at the correct frequency.

The circuit shown in FIG. 1 improves upon the prior art in many ways. First, oscillator 34 operates at a single frequency (twice the receive intermediate frequency) to provide both a reference signal for demodulation in receive mode and a reference signal for locking the output frequency in transmit mode, without the need for switching in response to a change in mode (trasmit/reveive) or frequency band (GSM/DCS). Further, the circuitry is simplified because a fixed frequency oscillator is used, reducing the number of VCOs in the transceiver.

FIG. 2 illustrates a second embodiment of the present invention for a dual-band GSM/DCS transceiver, illustrating that different frequencies can be associated with the VCO 26 and fixed frequency oscillator 34. In this embodiment, fixed frequency oscillator 34 produces a signal with a frequency of 492 MHz, and dual band oscillator 26 produces a signal in the ranges of 1171–1206 MHz for GSM received mode, 1126–1161 MHz for GSM transmit mode, 1559–1634 MHz for DCS receive mode and 1546–1621 for DCS transmit mode.

The operation of the transceiver of FIG. 2 is basically the same as the transceiver of FIG. 1, with a different IF frequency and a different reference frequency. Again, depending upon the channel, the signal being received is in the range of 925–960 MHz for GSM and between 1805 and 1880 for DCS. Assuming that data is being received on channel "1", the GSM frequency would be 925 MHz. For channel "1" in receive mode, the frequency of the signal from VCO 26 would be 1171 MHz. The frequency of the output of mixer 24 would be the difference, or 246 MHz. The demodulator uses a frequency of 246 MHz to demodulate the data, which is obtained by dividing the output of fixed oscillator 34 by two.

For a DCS signal modulated in the range 1805–1880 MHz, VCO 26 outputs a frequency of 1559–1634 MHz, to produce an intermediate frequency of 246 MHz. The demodulator uses a frequency of 246 MHz, obtained by dividing the output of fixed oscillator 34 by two.

On the transmit side, data is modulated at a range of 800–915 MHz for GSM and 1710–1785 MHz for DCS. For GSM transmissions, VCO 26 generates a signal with frequency in the range of 1126–1161 MHz, depending upon the channel being used. For DCS transmissions, VCO 26 generates a signal with a frequency in the range of 1546–1621. The output of mixer 38 will then be at 246 MHz for GSM and at 164 for DCS. The signal from demodulator 36 is divided by a factor of three for GSM or a factor of two for DCS, to produce an 82 MHz signal in both frequency bands. The signal produced by oxcillator 34 is divided by a factor of 6 (for both GSM and DCS) to produce an 82 MHz reference signal.

As in FIG. 1, the transceiver uses a single fixed frequency oscillator to generate a reference signal for demodulation of the IF signal and a reference signal to lock the transmit data stream at a desired frequency.

The choice of frequencies used in a given implementation could depend upon a number of factors. One factor is the harmonics produced by the oscillators; these harmonics may affect signals in the transceiver. Other frequencies ccould be chosen in addition to those shown in FIGS. 1 and 2, and diffrent divide ratios could be used in the demodulator 32 and frequency divider 44 and 48. While it is not essential that the frequency to PFD be the same for both the GSM and DCS modes, it is beneficial that the frequencies be close together, such that a single circuit can be used to compare the frequencies in both modes.

Further it is beneficial that the fixed frequency oscillator operate at a frequency that is twice the frequency of the IF signal, since this will provide for automatic quadrature from the output of the frequency divider in demodulator 32.

Although the detailed description of the invention has been directed to certain exemplary embodiments, various modifications of these embodiments, as well as alternative embodiments, will be suggested to those skilled in the art. The invention encompasses any modifications or alternative embodiments that fall within the scope of the claims.

What is claimed is:

1. A transceiver comprising:

circuitry for receiving an input signal in one of a plurality of frequency bands;

circuitry for tuning the input signal to an intermediate frequency signal;

a single frequency oscillator generating a reference signal at a known frequency;

circuitry for demodulating said intermediate frequency signal controlled by said reference signal;

circuitry for transmitting data at a frequency controlled directly by a submultiple frequency of said reference signal.

2. The transceiver of claim 1 wherein said tuning circuitry comprises:

a voltage controlled oscillator to produce a signal having a desired frequency;

a mixer coupled to said voltage controlled oscillator and said input signal.

3. The transceiver of claim 2 wherein the frequency of the intermediate frequency signal is constant for input signals in each frequency band.

4. The transceiver of claim 1 wherein said known frequency is twice the frequency of the intermediate frequency signal.

5. The transceiver of claim 1 wherein said transmitting circuitry comprises:

first frequency division circuitry for dividing said reference signal by a first known factor;

circuitry for modulating data on a signal of a predetermined frequency;

second frequency division circuitry for dividing said signal of said predetermined frequency by a second known factor;

difference circuitry for generating an output response to phase and frequency differences between outputs of said first frequency division circuitry and said second frequency division circuitry.

6. The transceiver of claim 5 wherein said transmitting circuitry further comprises a voltage controlled oscillator for generating a signal with a frequency responsive to the difference circuitry.

7. A method for transmitting and receiving signals, comprising the steps of:

receiving an input signal in one of a plurality of frequency bands;

tuning the input signal to an intermediate frequency signal;

generating a reference signal at a known frequency with a single fixed frequency oscillator;

demodulating said intermediate frequency signal responsive to said reference signal;

transmitting data at a frequency directly responsive to a submultiple frequency of said reference signal.

8. The method of claim 7 wherein said tuning step comprises:

generating a signal having a desired frequency using a voltage controlled oscillator;

mixing said signal from said voltage controlled oscillator with said input signal in a mixer.

9. The method of claim 8 wherein said step of the frequency of the intermediate frequency signal is constant for input signals in each frequency band.

10. The method of claim 7 wherein said step of generating a reference signal at a known frequency comprises the step of generating a reference signal at twice the frequency of the intermediate frequency signal.

11. The method of claim 7 wherein said transmitting step comprises:

dividing said reference signal by a first known factor to provide a first signal;

modulating data on a signal of a predetermined frequency;

dividing said signal of said predetermined frequency by a second known factor to provide a second signal;

generating an output responsive to phase and frequency differences between first and second signals.

12. The method of claim 7 wherein said transmitting step further comprises amplifying said output.

13. A transceiver comprising:

circuitry for receiving an input signal in one of a plurality of frequency bands;

a voltage controlled oscillator to produce a signal having a desired frequency response to a selected channel;

a mixer coupled to said voltage controlled oscillator and said input signal to generate an intermediate frequency signal;

a single fixed frequency oscillator generating a reference signal at a known frequency;

circuitry for demodulating said intermediate frequency signal controlled by said reference signal;

circuitry for transmitting data at a frequency controlled by said reference signal;

first frequency division circuitry for dividing said reference signal by a first known factor;

circuitry for modulating data on a signal of a predetermined frequency;

second frequency division circuitry for dividing said signal of said predetermined frequency by a second known factor; and difference circuitry for generating an output response to phase and frequency differences between output of said first frequency division circuitry and said second frequency division circuitry.

14. The transceiver of claim 13 wherein the frequency of the intermediate frequency signal is constant for input signals in each frequency band.

15. The transceiver of claim 13 wherein said known frequency is twice the frequency of the intermediate frequency signal.

16. The transceiver of claim 15 wherein said transmitting circuitry further comprises a voltage controlled oscillator for generating a signal with a frequency responsive to the difference circuitry.

* * * * *